United States Patent
Arngren et al.

(10) Patent No.: US 11,535,377 B2
(45) Date of Patent: Dec. 27, 2022

(54) METHOD PERFORMED IN AN AUTONOMOUS UNMANNED AERIAL VEHICLE FOR ENABLING AUTONOMOUS EMERGENCY ASSISTANCE FOR A COMMUNICATION DEVICE REGISTERED IN A REGULAR CELLULAR NETWORK, VEHICLE AND DEVICE THEREFORE

(71) Applicant: Telefonaktiebolaget LM Ericsson (publ), Stockholm (SE)

(72) Inventors: Tommy Arngren, Södra Sunderby (SE); Jonas Pettersson, Luleå (SE); Ylva Timner, Luleå (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 315 days.

(21) Appl. No.: 16/772,527

(22) PCT Filed: Dec. 22, 2017

(86) PCT No.: PCT/EP2017/084489
§ 371 (c)(1),
(2) Date: Jun. 12, 2020

(87) PCT Pub. No.: WO2019/120577
PCT Pub. Date: Jun. 27, 2019

(65) Prior Publication Data
US 2020/0385118 A1 Dec. 10, 2020

(51) Int. Cl.
*G01C 23/00* (2006.01)
*B64C 39/02* (2006.01)
(Continued)

(52) U.S. Cl.
CPC ......... *B64C 39/024* (2013.01); *G05D 1/0022* (2013.01); *G05D 1/101* (2013.01);
(Continued)

(58) Field of Classification Search
USPC .......................................... 455/418–420, 431
See application file for complete search history.

(56) References Cited

U.S. PATENT DOCUMENTS 9,392,570 B1    7/2016  Zhang
2012/0058795 A1*  3/2012  Lee .......................... H04W 4/90
                                                    455/521
(Continued)

FOREIGN PATENT DOCUMENTS

CN    102749638 A    10/2012
CN    105068486 A    11/2015
(Continued)

OTHER PUBLICATIONS

1st Office Action, Chinese Patent Application No. 201780097895.7, dated Oct. 9, 2021, 9 pages.
(Continued)

*Primary Examiner* — Suhail Khan
(74) *Attorney, Agent, or Firm* — Sage Patent Group

(57) ABSTRACT

A method for enabling autonomous emergency assistance for one or more communication device, CD, registered in a regular cellular network. The method is performed in an autonomous unmanned aerial vehicle, UAV, and comprises emulating a cellular network in a geographical region, wherein the UAV and the one or more CD are without connectivity with the regular cellular network, sending an information message in the geographical region, the message comprising an emergency response trigger, receiving an automatic emergency data response from the one or more CD in the geographical region, in response to the sent
(Continued)

message, and determining an action based on the received automatic emergency data response. A CD, a UAV, a computer program and a computer program product are also presented.

38 Claims, 5 Drawing Sheets

(51) Int. Cl.
    *H04W 4/42*     (2018.01)
    *H04W 4/90*     (2018.01)
    *G05D 1/00*     (2006.01)
    *G05D 1/10*     (2006.01)
    *H04W 4/021*     (2018.01)
    *H04W 4/20*     (2018.01)
    *H04W 68/02*     (2009.01)

(52) U.S. Cl.
    CPC .............. *H04W 4/021* (2013.01); *H04W 4/20* (2013.01); *H04W 4/42* (2018.02); *H04W 4/90* (2018.02); *H04W 68/02* (2013.01); *B64C 2201/122* (2013.01)

(56) References Cited

U.S. PATENT DOCUMENTS

| | | |
|---|---|---|
| 2014/0241239 A1 | 8/2014 | Chang |
| 2015/0215757 A1* | 7/2015 | Miskiewicz .......... H04W 48/12 |
| | | 455/552.1 |
| 2018/0102831 A1* | 4/2018 | Murphy ................ H04W 76/11 |

FOREIGN PATENT DOCUMENTS

| | | |
|---|---|---|
| CN | 105637909 A | 6/2016 |
| CN | 107276661 A | 10/2017 |
| WO | WO 2015/021159 A1 | 2/2015 |

OTHER PUBLICATIONS

International Search Report and Written Opinion of the International Searching Authority, PCT/EP2017/084489, dated Sep. 18, 2018, 9 pages.

Lodeiro-Santiago, M. et al., "UAV-Based Rescue System for Emergency Situations," (XP047362501) Proceedings of the Medical Image Computing and Computer-Assisted Intervention—MICCAI 2015: 18$^{th}$ International Conference, Oct. 5-9, 2015, Munich, Germany, 11 pages.

* cited by examiner

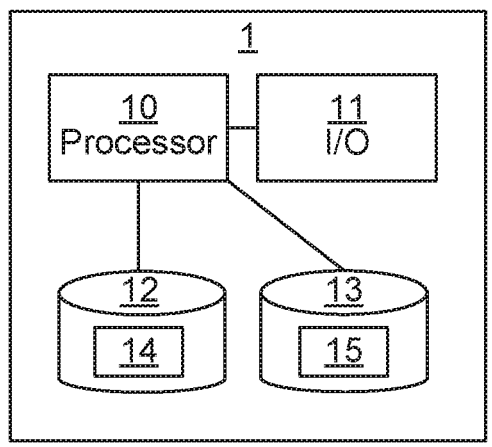
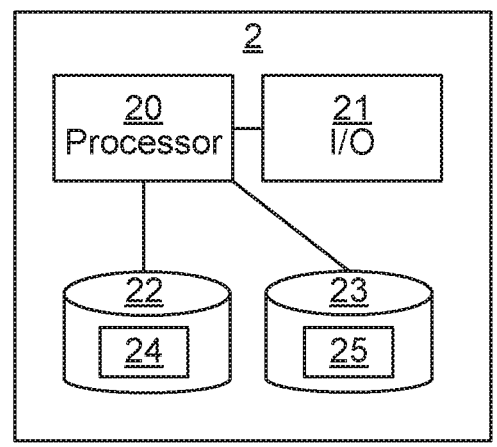
Fig. 6                    Fig. 7
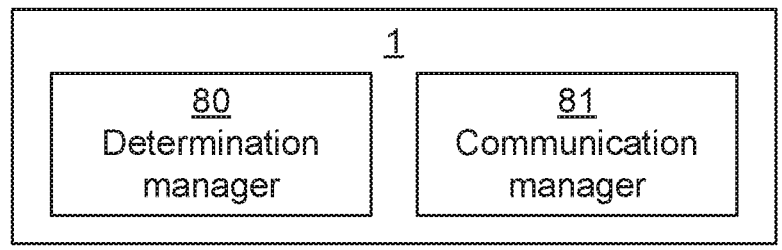
Fig. 8
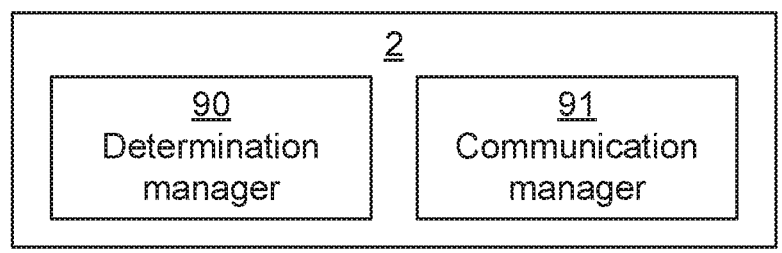
Fig. 9

METHOD PERFORMED IN AN AUTONOMOUS UNMANNED AERIAL VEHICLE FOR ENABLING AUTONOMOUS EMERGENCY ASSISTANCE FOR A COMMUNICATION DEVICE REGISTERED IN A REGULAR CELLULAR NETWORK, VEHICLE AND DEVICE THEREFORE

CROSS REFERENCE TO RELATED APPLICATIONS

This application is a 35 U.S.C. § 371 national stage application of PCT International Application No. PCT/EP2017/084489 filed on Dec. 22, 2017, the disclosure and content of which is incorporated by reference herein in its entirety.

TECHNICAL FIELD

The invention relates to methods for enabling autonomous emergency assistance for one or more communication device registered in a regular cellular network, communication devices, unmanned aerial vehicles, computer programs and computer program products thereof.

BACKGROUND

Unmanned aerial vehicles (UAVs) are used in a wide variety of applications throughout the society. Examples include delivery services, aerial photography and film making, remote sensing tasks for agriculture, city planning, civil engineering, support for public safety and rescue services, etc. There are many different types of UAVs that can be remotely controlled using Wi-Fi or some proprietary radio technology. UAVs are capable of communication, sensing as well as autonomous operation and also able to analysing data collected via sensors, camera etc. UAVs can be used as relays between ground-based terminals and a network base station to extend the reach range of a network. Also, UAVs can serve as flying GSM base stations and then provide cellular network coverage to users [UAV-based GSM network for public safety communications, IEEE, K Guevara, 2015].

A robust network access is crucial for safe and efficient rescue operations related to emergency situations and in disaster areas. It is possible to set up mobile networks for voice and data communication that enable aid agencies to work more efficiently at disaster sites. This can e.g. be done using a satellite dish and Wi-Fi access points. Also, the Ericsson Response MiniGSM system is a total system solution including different functional components such as Mobile Switching Center (MSC), Base Station Controller (BSC), Radio Base Station (RBS), network management, network database and operations and maintenance (O&M). The unit is built into an easily transportable 7-foot long container, complete with climate control for the equipment. System maintenance and operation can be managed locally or remotely. The system supports both GSM 900, 1800 and 1900 MHz frequencies, either individually or dual band. The network can operate as standalone with its own network identity, or it can be part of a larger network. In both cases, subscribers from other networks can roam onto the MiniGSM system under the same conditions as for any other cellular network. Coverage areas with a radius of up to 35 kilometres can be established.

Voice or text-enabled digital assistants is a common phenomenon in our phones, computers or home appliances and are known by names such as Echo, Alexa, Ski, Cortana, and Google now. Common for all of these digital assistants is that they rely on internet access (i.e. are cloud based) and on the artificial intelligence (AI) technology known as deep learning (and natural language processing (NLP)), which requires access to huge amount of data to give software the ability to do things like understanding the human voice.

3rd Generation Partnership Project (3GPP) Technical Specification (TS) 36.331, sections 5.2.1.1 and 5.2.1.2 describe how system information is handled within e.g. a long term evolution (LTE) system.

System information is in LTE divided into a MasterInformationBlock (MIB) and several SystemInformationBlocks (SIBs). The MIB includes a limited number of the most essential and the most frequently transmitted parameters that are needed to acquire other information from the cell. The MIB is transmitted on a broadcast channel (BCH). SIBs, other than SystemInformationBlockType1, are carried in SystemInformation (SI) messages and mapping of SIBs to SI messages is flexibly configurable by a schedulingInfoList included in SystemInformationBlockType1, with restrictions that: each SIB is contained only in a single SI message, and at most once in that message. Only SIBs having the same scheduling requirement (periodicity) can be mapped to the same SI message, and SystemInformationBlockType2 is always mapped to the SI message that corresponds to the first entry in the list of SI messages in schedulingInfoList. There may be multiple SI messages transmitted with the same periodicity. SystemInformationBlockType1 and all SI messages are transmitted on Downlink Shared Channel (DL-SCH).

The MIB uses a fixed schedule with a periodicity of 40 ms and repetitions made within 40 ms. The first transmission of the MIB is scheduled in subframe #0 of radio frames for which the System Frame Number (SFN) mod 4=0, and repetitions are scheduled in subframe #0 of all other radio frames. For Time Division Duplex (TDD)/Frequency Division Duplex (FDD) systems with a bandwidth larger than 1.4 MHz that supports bandwidth reduced complexity (BL) user equipments (UEs) or UEs in coverage enhancement (CE), MIB transmissions may be repeated in subframe #9 of the previous radio frame for FDD and subframe #5 of the same radio frame for TDD.

The MIB—Multimedia Broadcast Multicast Service (MBMS) uses a fixed schedule with a periodicity of 160 ms and repetitions made within 160 ms. The first transmission of the MIB-MBMS is scheduled in subframe #0 of radio frames for which the SFN mod 16=0, and repetitions are scheduled in subframe #0 of all other radio frames for which the SFN mod 4=0.

The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

The MIB is the first thing a UE looks for after it achieves downlink synchronization. The MIB carries the most essential information needed for a UE to be able to acquire other information from the cell, including:

Downlink channel bandwidth
Physical Hybrid—Automatic Repeat Request Indicator Channel (PHICH) configuration
SFN, i.e. System Frame Number
Evolved Node B (eNB) transmit antenna configuration specifying number eNB transmit (TX) antennas SIB1 is carried in a SystemInformationBlockType1 message. It includes information related to UE cell access and defines the schedules of other SIBs, such as:

public land mobile network (PLMN) identities
    Tracking area code (TAC) and cell ID
    Cell barring status (if a UE may camp on the cell or not)
    q-RxLevMin, minimum required receive (Rx) Level in the cell to fulfil the cell selection criteria
    Transmissions times and periodicities of other SIBs SIB2 contains radio resource configuration information common for all UEs, including:

Uplink (UL) carrier frequency and UL channel bandwidth
    Random Access Channel (RACH) configuration, i.e. preamble information, transmit time in terms of frame and subframe number (physical RACH-ConfigInfo), and powerRampingParameters
    Paging configuration, paging cycle
    UL power control configuration, Po-NominalPUSCH/Physical Uplink Control Channel (PUCCH)
    Sounding Reference Signal configuration
    PUCCH configuration, for transmission of acknowledgement (ACK)/non-ACK (NACK), scheduling requests, and Channel Quality Indicator (CQI) reports
    PUSCH configuration SIB3 contains information common for intra-frequency, inter-frequency, and/or inter-Radio Access Technology (RAT) cell reselection (information does not necessarily apply to all scenarios, see 3GPP TS36.304 for details).

SIB4 contains intra-frequency neighbouring cell information for Intra-LTE intra-frequency cell reselection, such as neighbour cell list, black cell list, and Physical Cell Identities (PCIs) for Closed Subscriber Group (CSG). CSG can be used to support home eNBs.

SIB5 contains the neighbour cell related information for Intra-LTE inter-frequency cell-reselection, such as neighbour cell list, carrier frequency, cell reselection priority, threshold used by the UE when reselecting a higher/lower priority frequency than the current serving frequency, etc.

SIB6 contains information for Inter-RAT (IRAT) cell reselection to Universal Terrestrial Radio Access Network (UTRAN), such as:

Carrier frequency List: list of neighbouring UTRAN carrier frequencies
    Cell reselection priority: absolute priority
    Q_RxLevMin: minimum required Rx level
    ThreshX-high/ThreshX-low: threshold used by the UE when reselecting a higher/lower priority frequency than the current serving frequency
    T-ReselectionURTA: cell reselection timer value for UTRAN
    Speed dependent reselection parameters SIB7 contains information for IRAT cell reselection to GSM/EDGE Radio Access Network (GERAN) (similarly to SIB6).

SIB8 contains information for IRAT cell reselection to evolved High Rate Packet Data (eHRPD), which is the 1xEV-DO Rev.A with the support of connectivity to Evolved Packet Core of LTE.

SIB9 contains a home eNB name, wherein home eNB is a femto-cell in the context of LTE, a small base station used in residential area or by small businesses.

SIB10 is for an Earthquake and Tsunami Warning System (ETWS) primary notification. Paging procedure is used to inform the ETWS capable UEs in Radio Resource Control (RRC) idle and RRC connected modes to listen to SIB10 and SIB11.

Important contents of SystemInformationBlockType10: messageIdentifier, serialNumber, warningType, warningSecurityInfo.

Field Descriptions:

| | |
|---|---|
| messageIdentifier | Identifies the source and type of ETWS notification (earthquake, tsunami warning, any emergency or test message) |
| serialNumber | Identifies variations of an ETWS notification.<br>-uses various mechanisms to alert the user (display message, play a tone or vibrate, location where the message is applicable, also contains an update number which specifies whether a change is in the message content or not) |
| warningType | # Identifies the warning type of the ETWS primary notification (earthquake, tsunami, etc.) and<br># provides information on emergency user alert and UE popup |
| warningSecurityInfo | # is optional, only applied when security is applied<br># Provides security information for the ETWS notification |

SIB11 is for an ETWS secondary notification.

Important contents of SystemInformationBlockType11: messageIdentifier, serialNumber, warningMessageSegmentType, warningMessageSegmentNumber, warningMessageSegment, dataCodingScheme.

Field Descriptions:

| | |
|---|---|
| messageIdentifier | Identifies the source and type of ETWS notification (earthquake, tsunami warning, any emergency or test message) |
| serialNumber | Identifies variations of an ETWS notification.<br>-uses various mechanisms to alert the user (display message, play a tone or vibrate, location where the message is applicable, also contains an update number which specifies whether a change is in the message content or not) |
| warningMessageSegmentType [last/not last] | Indicates whether the included ETWS warning message segment is the last segment of the complete segment or not |
| warningMessageSegmentNumber | # allows ordering of the message segments<br># Segment number of the ETWS warning message segment contained in the SIB. A segment number of zero corresponds to the first segment, one corresponds to the second segment, and so on |
| warningMessageSegment | carries actual segment of the message |
| dataCodingScheme | Identifies the alphabet/coding and the language applied variations of an ETWS notification |

US2016/0127439 describes how a UE receives a system information broadcast message with a multimedia alert contained therein. The multimedia alert triggers the UE to automatically initiate a multimedia broadcast application to process the alert, to automatically tune the UE to the streaming multimedia content associated with the alert and enable processing of the streaming multimedia content on the UE.

The UE is not required to respond to the network upon an alert contained in system information broadcasts. The network does not receive any data from the UE.

US2016/0360562 discuss autonomous Unmanned Vehicles (UVs), which may include UAVs that can operate as mobile nodes (UV nodes) in e.g. a mesh network, providing network access to terminals in remote locations.

Terminals considered friendly to the UV can access the network via the UV. It is described how commands can be pre-set for specific tasks to be executed by a terminal after reception from an UV node (could be comparable to setting up a dialogue).

Only known/friendly devices can access the network provided by the UV.

US2016191142 disclose a method for improving cellular coverage of existing (and operable) cellular networks by providing UAVs to a prioritized area so that the UAVs can operate as temporary mobile device cellular towers. The document seems to focus on how to find areas that are about to be critical with respect to coverage or accessibility.

The method does not detect and initiate a dialogue with people and devices in emergency situations.

US2016337027 discloses a method for detecting an UAV by a ground terminal and to set-up a connection to a network via the UAV by directing an antenna beam towards the UAV. According to paragraph [0037] a ground terminal may e.g. be mobile terminal. I.e. a method for a ground station to detect and connect to a UAV is described.

These documents disclose ways of setting up temporary connections both as replacement and for adding capacity. Predetermined commands can be provided from an UAV to a terminal for accomplishing certain tasks, and sensors can be used for collecting data. Terminals can find a UAV and UAVs can search for terminals.

SUMMARY

An object of embodiments presented herein is to enable autonomous emergency assistance for a communication device (CD).

Embodiment presented herein enables a rescue operation, in case of no or limited network access, by initiating access with CDs in an emergency/disaster area using unmanned aerial vehicles (UAVs) that emulate a cellular network, triggering automatic collection of vital data from CDs in range as part of the initial access procedure, enabling network edge UAVs to collect and analyze data from CDs, and enabling network edge UAVs to initiate dialogue with responding CDs.

According to a first aspect a method for enabling autonomous emergency assistance for one or more CDs registered in a regular cellular network is presented. The method is performed in an autonomous UAV and comprises emulating a cellular network in a geographical region, wherein the UAV and the one or more CD are without connectivity with the regular cellular network, sending an information message in the geographical region, the message comprising an emergency response trigger, receiving an automatic emergency data response from the one or more CD in the geographical region, in response to the sent message, and determining an action based on the received automatic emergency data response.

The method may further comprise directing the UAV to a geographical region wherein the one or more CD is expected to be without connectivity with the regular cellular network.

The automatic emergency data response message may be included in a Random Access Channel, RACH, response message.

The sending step may be comprised of paging a system information block, SIB, message. The SIB message may comprise one or more of the following: a parameter initiating an automatic response by the CD, a parameter initiating a CD client application, a UAV credential for device-to-device, D2D, communication in the geographical region, an instruction to collect CD sensor data, and image data.

The method may further comprise establishing connectivity with the one or more CD.

The automatic emergency data response message may comprise an indication of one or more of the following: CD identity, CD time, SIB counter value, battery status, emergency status, and sensor data.

The determining step may comprise determining one or more of the following: number of preregistered CDs in the geographical region, number of other CDs in the geographical region, status of each responding CD.

The action may further be based on sensor data acquired in the geographical region. The sensor data may be acquired from the UAV and the CD.

The action may be one or more of the following: directing the UAV to backhaul connectivity, directing the UAV to a new geographical region, notifying a rescue team CD within the geographical region, initiating communication with the one ore more CD, and sending an information message to the one or more CD.

The method may further comprise sending a request for additional emergency data through at least one of hypermedia message, short text message and voice communication, and receiving an additional emergency data response through corresponding hypermedia message, short text message and/or voice communication.

According to a second aspect, there is presented a method for enabling autonomous emergency assistance for a CD registered in a regular cellular network. The method us performed in the CD and comprises receiving an information message from an autonomous UAV, the message comprising an emergency response trigger, wherein the UAV and CD are without connectivity with the regular cellular network, initiating one or more action in response to the received emergency response trigger, and automatically sending an emergency data response message comprising content based on the initiated one or more action to the UAV.

The method may further comprise establishing connectivity with the UAV.

The automatic emergency data response message may comprise an indication of one or more of the following: CD identity, CD time, SIB counter value, battery status, emergency status, and sensor data.

The received information message may be comprised of a paged SIB message. The SIB message may comprise one or more of the following: a parameter initiating an automatic response by the CD, a parameter initiating a CD client application, a UAV credential for device-to-device, D2D, communication in the geographical region, an instruction to collect CD sensor data, and image data from the UAV.

The method may further comprise acquiring sensor data.

The method may further comprise receiving a request for additional emergency data through hypermedia message, short text message and/or voice communication, and sending an additional emergency data response through corresponding hypermedia message, short text message and/or voice communication.

According to a third aspect, there is presented an autonomous UAV for enabling autonomous emergency assistance for one or more CD registered in a regular cellular network. The UAV comprises a processor and a computer program product storing instructions that, when executed by the processor, causes the UAV to emulate a cellular network in a geographical region, wherein the UAV and the one or more CD are without connectivity with the regular cellular network, to send an information message in the geographical region, the message comprising an emergency response trigger, to receive an automatic emergency data response from the one or more CD in the geographical region, in response to the sent message, and to determine an action based on the received automatic emergency data response.

The UAV may further be caused to direct the UAV to a geographical region wherein the one or more CD is expected to be without connectivity with the regular cellular network.

The automatic emergency data response message may be included in a RACH response message.

The sending step may be comprised of paging a SIB message. The SIB message may comprise one or more of the following: a parameter initiating an automatic response by the CD, a parameter initiating a CD client application, a UAV credential for device-to-device, D2D, communication in the geographical region, an instruction to collect CD sensor data, and image data.

The UAV may further be caused to establish connectivity with the one or more CD.

The automatic emergency data response message may comprise an indication of one or more of the following: CD identity, CD time, SIB counter value, battery status, emergency status, and sensor data.

The determine step may comprise determining one or more of the following: number of preregistered CDs in the geographical region, number of other CDs in the geographical region, status of each responding CD.

The action may further be based on sensor data acquired in the geographical region. The sensor data may be acquired from the UAV and the CD.

The action may be one or more of the following: directing the UAV to backhaul connectivity, directing the UAV to a new geographical region, notifying a rescue team CD within the geographical region, initiating communication with the one ore more CD, and sending an information message to the one or more CD.

The UAV may further be caused to send a request for additional emergency data through at least one of hypermedia message, short text message and voice communication, and to receive an additional emergency data response through corresponding hypermedia message, short text message and/or voice communication.

According to a fourth aspect, there is presented a CD for enabling autonomous emergency assistance for the CD registered in a regular cellular network. The CD comprises a processor and a computer program product storing instructions that, when executed by the processor, causes the CD to receive an information message from an autonomous UAV, the message comprising an emergency response trigger, wherein the UAV and CD are without connectivity with the regular cellular network, initiate one or more action in response to the received emergency response trigger, and to automatically send an emergency data response message comprising content based on the initiated one or more action to the UAV.

The CD may further be caused to establish connectivity with the UAV.

The automatic emergency data response message may comprise an indication of one or more of the following: CD identity, CD time, SIB counter value, battery status, emergency status, and sensor data.

The received information message may be comprised of a paged SIB message. The SIB message may comprise one or more of the following: a parameter initiating an automatic response by the CD, a parameter initiating a CD client application, a UAV credential for device-to-device, D2D, communication in the geographical region, an instruction to collect CD sensor data, and image data from the UAV.

The CD may further be caused to acquire sensor data.

The CD may further be caused to receive a request for additional emergency data through hypermedia message, short text message and/or voice communication, and to send an additional emergency data response through corresponding hypermedia message, short text message and/or voice communication.

According to a fifth aspect, there is presented an autonomous UAV for enabling autonomous emergency assistance for a CD registered in a regular cellular network. The UAV comprises a determination manger for emulating a cellular network in a geographical region, wherein the UAV and the one or more CD are without connectivity with the regular cellular network, and for determining an action based on the received automatic emergency data response, and a communication manager 91) for sending an information message in the geographical region, the message comprising an emergency response trigger, and for receiving an automatic emergency data response from the one or more CD in the geographical region, in response to the sent message.

According to a sixth aspect, there is presented a CD for enabling autonomous emergency assistance thereof, wherein the CD is registered in a regular cellular network. The CD comprises a communication manager for receiving an information message from an autonomous UAV, the message comprising an emergency response trigger, wherein the UAV and CD are without connectivity with the regular cellular network, and for automatically sending an emergency data response message comprising content based on the initiated one or more action to the UAV, and a determination manager for initiating one or more action in response to the received emergency response trigger.

According to a seventh aspect, there is presented a computer program for enabling autonomous emergency assistance for a CD registered in a regular cellular network. The computer program comprises computer program code which, when run on an autonomous UAV, causes the UAV to emulate a cellular network in a geographical region, wherein the UAV and the one or more CD are without connectivity with the regular cellular network, to send an information message in the geographical region, the message comprising an emergency response trigger, to receive an automatic emergency data response from the one or more CD in the geographical region, in response to the sent message, and to determine an action based on the received automatic emergency data response.

According to an eighth aspect, there is presented a computer program for enabling autonomous emergency assistance for a CD registered in a regular cellular network. The computer program comprises computer program code which, when run on the CD, causes the CD to provide one or more geographical position, connected to corresponding preregistered periods of time, to the regular cellular network, wherein the provided one ore more geographical position is preregistered in the regular cellular network, to receive an information message from an autonomous UAV, the message comprising an emergency response trigger, wherein the UAV and CD are without connectivity with the regular cellular network, to initiate one or more action in response to the received emergency response trigger, and to automatically send an emergency data response message comprising content based on the initiated one or more action to the UAV.

A computer program product comprising a computer program and a computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 6-7 are schematic diagrams illustrating some components of devices presented herein; and FIGS. 8-9 are schematic diagrams showing functional modules of devices presented herein.

DETAILED DESCRIPTION

Figure 1:
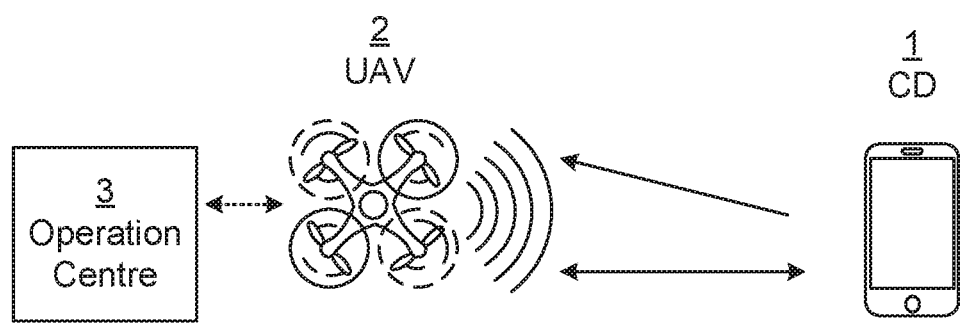
FIG. 1 schematically illustrates an environment wherein embodiments presented herein may be applied.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

It is today a problem to automatically obtain and analyze vital information from people and devices in an emergency area with no or very limited network access.

Solutions of today use cell broadcast for emergency alerts (Earthquake and Tsunami Warning System (ETWS), Commercial Mobile Alert System (CMAS) to communication devices (CDs) within range of a base station, but does not enable CDs to automatically respond to such alerts/paging.

In case of a large emergency or in disaster situations, with no or limited network access, existing solutions have e.g. the following problems:

To initiate access with CDs in the emergency/disaster area.

To trig automatic collection of data from CDs in the emergency/disaster area.

To enable collection and analyzation of data from CDs in the emergency/disaster area or near an edge of the network.

To determine number of CDs (known and others) in a certain part of the emergency area To enable a network edge (near an edge of the network) to initiate a dialogue with CDs in the emergency/disaster area.

This is enabled as presented herein with an unmanned aerial vehicle (UAV) and a CD, where the UAV emulates a base station in a cellular network, and the CD is capable of connecting to the cellular network. The UAV may send a broadcast Emergency Response Trigger to CD's in range, including information on how to respond, and with what data. The CD receives the Emergency Response Trigger from the UAV, connects to the UAV, using access information included in the Emergency response trigger, and sends a CD Emergency Response including requested data. A request for response data may e.g. request that the response should indicate a received counter value, a CD ID, location, battery status and/or emergency status.

Embodiments are presented that, for CDs in range of a UAV as described herein, provide connectivity, provide emergency information and trigger collection of data from CDs and users in range. Data obtained from CDs in range may be continuously analyzed to provide an overview of a situation and to support people in need.

Use of an autonomous emergency assistant, for a disaster area, is described in the following. The functionality is implemented in CD's (as a downloaded app, or built-in functionality):

1) An area is struck by an earthquake, and the mobile network is destroyed.
2) An autonomous UAV is directed into the disaster area. The UAV contains equipment that emulates a cellular network.
3) Several CDs discover the new network and receives system information blocks (SIBs) from the UAV including an emergency response trigger and emergency information e.g. including predefined information about the earthquake and evacuation information.
4) Each CD may signal the user e.g. by displaying emergency information on the screen or by playing a voice message, and if privacy settings allow, may automatically connect the CD to the UAV and send a CD emergency response with requested data such as e.g. location data. The CD may e.g. respond with information in case the user has been signaled but has not responded, which may indicate that the user is in urgent need.
5) The users may respond further manually, in addition to an automatic response, and communicate with the UAV e.g. using voice or text messages.
6) The UAV may respond to any manual communication as a chatbot using text messages or voice synthesis. Users may inform the UAV of emergency status, and the UAV may give further instructions.
7) The UAV analyzes the data collected through automatic CD emergency responses and optional manual communications and take appropriate actions, such as:
    a. Initiate communication with users that have not replied manually.
    b. Immediately return to an emergency center or area with network coverage to forward information retrieved from one or more CDs to the emergency center.
    c. Continue into the disaster area or another area to collect more information.

An embodiment, illustrated in FIG. 1, comprises the following components:

An UAV 2 that
    emulates a cellular (emergency) network
    transmits system information blocks (SIB) for emergency information to CDs, which SIB triggers response from the CDs and optionally from users thereof
    collects and analyzes data from the CDs within range based on input from the CDs, sensor input, and UAV data, take appropriate action(s)

CD(s) 1 with cellular subscription, such as user equipment (UEs), smartphones and sensors, and internet of thing (IoT) devices, that
receives system information and respond automatically according to the received information (e.g. through a downloaded app)

An operation center 3
responsible for controlling the UAVs

Figure 2:
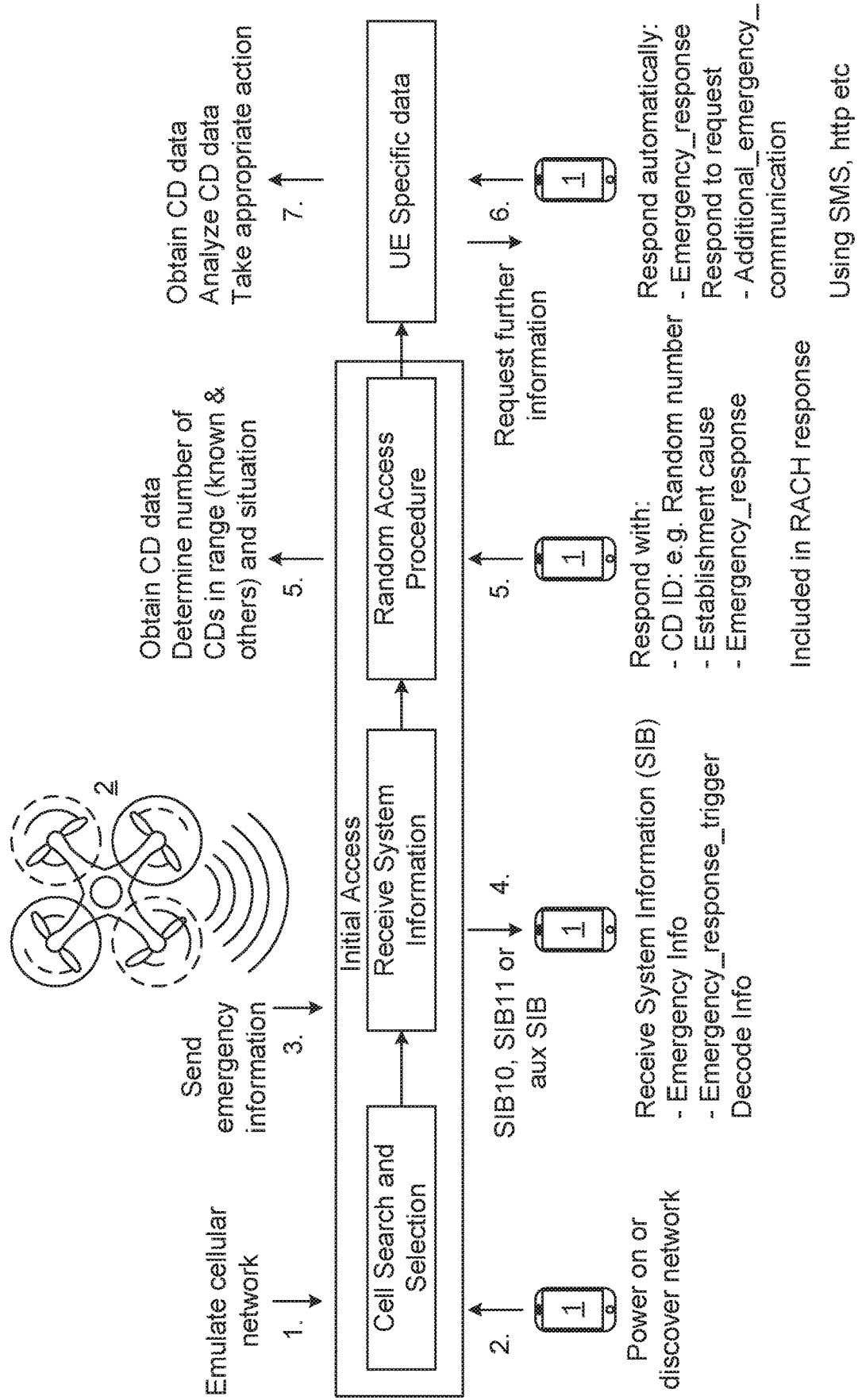
FIG. 2 schematically illustrates establishment of connectivity between an UAV and a CD according to an embodiment presented herein.

Connectivity between the UAV and a CD may be enabled by the following steps, as illustrated in FIG. 2:

1. The UAV 2 enters an area and emulates a cellular network, broadcasting a signal telling all CDs 1 in range that there is now a cellular network available for communication.

2. CDs 1 in range discover the cellular network, by cell search and selection of the UAV 2 as base station for the discovered cellular network.

3. The UAV 2 broadcasts emergency information to the CDs in range, using an auxiliary SIB and/or existing standard SIB10/SIB11, to trigger the CD's to automatically respond, and to inform them how to respond.

4. The CDs 1 receive system information, by a SIB containing an emergency_response_trigger. Emergency information may be provided to the CD and e.g. displayed on the CD or played in a voice message, and an automatic CD response is prepared via e.g. a downloaded app. The SIB at least contains a bit indicating if an automatic response is required or if a manual user response is required.

5. The UAV 2 and the CDs 1 proceed with a Random Access Procedure, wherein the CDs transmit response information related to the random access procedure. One alternative is to include the automatic CD_emergency_response in a response message in the RACH procedure, e.g. in a so called message 3, which response in other aspects follows a standard RACH response. In another alternative the automatic CD_emergency_response is included after the RACH procedure, wherein a connection has been set up and allows data to be sent. The UAV collect received CD data and may e.g. determine number of CDs in range and their status, and may also decide to directly take an appropriate action as presented in point 7, without collecting further information by further communication with the CD as presented in point 6. The UAV may e.g. determine and store number of known CDs, i.e. preregistered in the UAV such as CDs for rescue personal located within range of the UAV, and other, previously unknown, CDs within range in the area or in parts of the area, such as sectors of the area, and sum up the number of CDs in different sectors of the area. Previously unknown CDs may, in this way become known to the UAV during the random access procedure.

6. After the Random Access Procedure, e.g. dependent on earlier responses, the UAV may request further information of the CDs 1, which further request may be a continuation of the already set up contact, or may be requested by transmission of a further mergency_response_trigger. The CDs 1 responds automatically and/or manually in the further communication with the UAV. The further received emergency_response_trigger may thus be in addition to the one received in point 4. The further response may comprise an automatic CD_emergency_response, or additional_emergency_communication, allowing user input, or a combination of the two. Selection of what the response should comprise may be indicated by the trigger received in the further request.

7. The UAV 2 collects and analyzes all CD responses and take appropriate action, such as provide data to Operation Center 3 (by flying back to Operation Center), notify possible rescue personal within range, or provide advice to users, such as move to a safe zone, e.g. illustrated by a map. Directions to a safe zone may be send individually to a specific CD with detailed instruction of how to get to the safe zone, or may be broadcast with general information of where one or more safe zones can be found.

Figure 3:
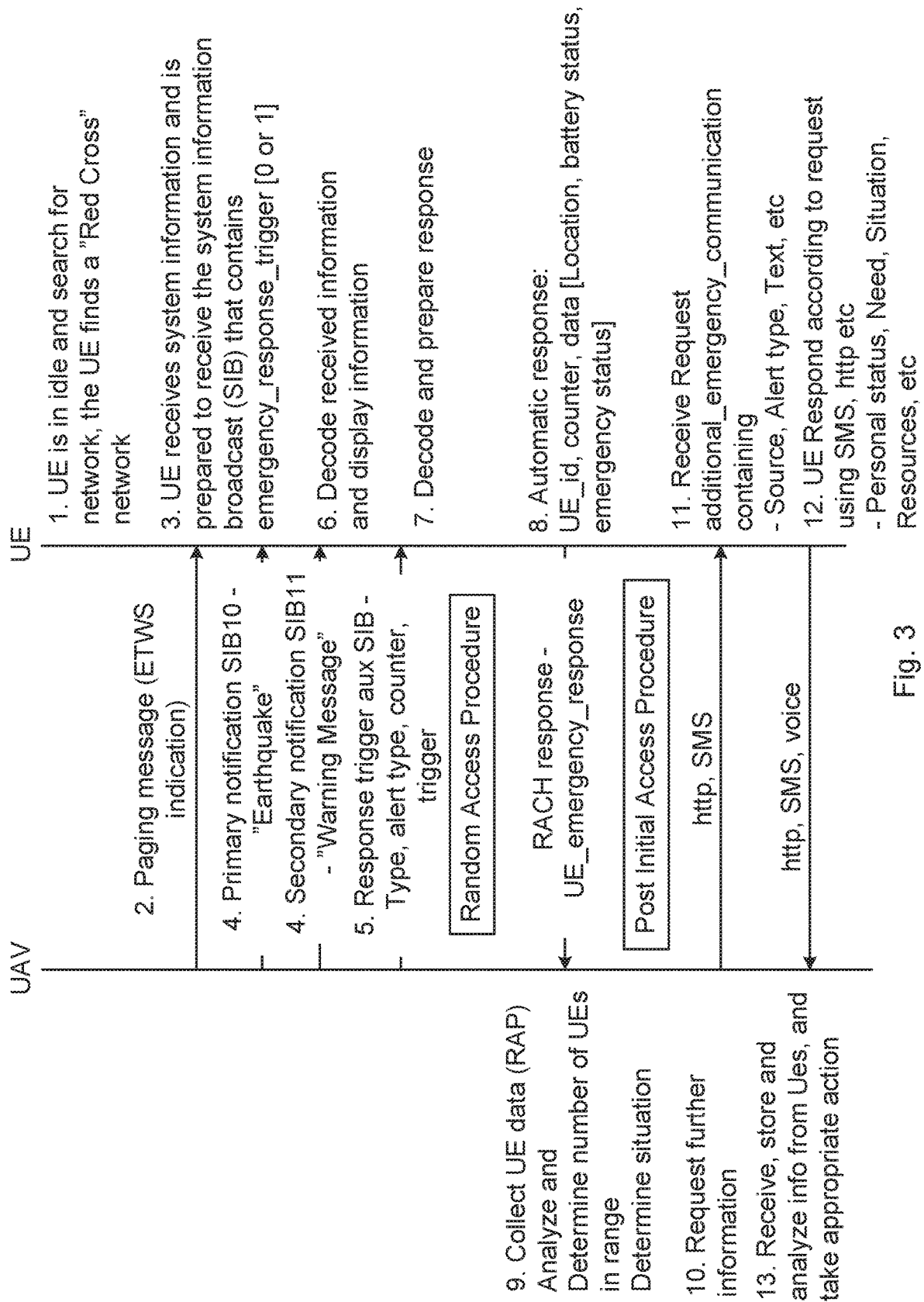
FIG. 3 schematically illustrates a signalling diagram according to an embodiment presented herein.

Connectivity between the UAV and a CD, here exemplified by a user equipment (UE), may be enabled by the following sequence, as illustrated in FIG. 3.

1. An UE is in idle mode and search for a cellular network. The UE finds an emergency network ("Red Cross" network) provided via a UAV and receives system information from the UAV.

2. The UAV may send a paging message with an ETWS notification to the UE, informing the UE of an emergency to monitor.

3. The UE is now prepared to receive SIBs that contains an Emergency_response_trigger.

4. The UAV may send a primary notification SIB10, such as e.g. "Earthquake", and optionally a secondary notification SIB11, such as e.g. "Warning Message", comprising an emergency_response_trigger.

5. The UAV may send a response trigger aux SIB, comprising an emergency_response_trigger, which aux SIB also may indicate requested response data type, alert type, counter, trigger. The aux SIB may be used in addition to a general paging message (point 2) and/or in addition to SIB10/11 messages (point 4), or may be used without previous messages 2 and 4.

6. The UE decodes received information and may present the received information for the user. The received information may be presented to the user by text on a display or by audio in a voice message.

7. The UE decodes a received trigger and prepares a response. The received trigger may e.g. request an automatic response, a manual response or a combination of both.

8. In a random access procedure (RAP) the UE sends an automatic response message in the RACH procedure indicating e.g. CD_ID, counter, data such as location, battery status, and emergency status.

9. The UAV collects the received UE data, analyzes them and may determine e.g. number of UEs in range, and thereafter determines the situation.

10. After the initial access procedure the UAV may request further information, e.g. through http or SMS communication. The request for further information may e.g. be dependent on earlier received responses. The further information may e.g. require user response such as if there are other people in distress.

11. The UE receives the request for additional emergency communication comprising e.g. Source, Alert type, and Text. The source may e.g. be which source the request comes from, such as "Red Cross". The alert type may indicate audio, display and/or vibrate. The text may be a dialog such as "Asking for further info".

12. The UE responds according to request using e.g. SMS or http, e.g. providing personal status, need, and situation.

13. The UAV receives, stores and analyzes the received information and take appropriate action in response to the analyzed data.

The auxiliary SIB (aux SIB) is a message comprising an emergency response trigger requesting an automatic response, with information on how to respond, and with what information.

The aux SIB message may contain one or more of the following:

MessageIdentifier: Source, corresponding to field description of SIB10, e.g. comprised by a bit indicating automatic and/or manual response required AlertType: How the CD should alert the user, no alert, sound, vibrate, and/or display Counter: 1 to n (a temporary counter identifier to facilitate keeping track of number of CDs, i.e. functioning as a message ID), different paging message may have different counter values allowing an improved analysis of responses Trigger type: Automatic response and/or manual response required Access information: Information for the CD to be able to connect to the UAV, such as cell ID and network ID, included in regular RACH and/or emergency RACH to connect without identification Response method: Indication of possible response protocol for further information, such as SMS, Embedded in voice call, http, app, text, chat, video, image, audio Response address: connected to response methods—e.g. an emergency number or other phone number to call, or an URL to receive information related to the emergency area Response data: Data required to be included in the response.

The CD receives and decodes the emergency_response_trigger included in existing SIB10/SIB11 or in an aux SIB. The CD sends an automatic emergency response message in a RACH procedure, or after the RACH procedure, and optionally further, after initial access, included via SMS, http, or embedded in voice call. A further manual response may be requested when further data is needed to decide on an appropriate action to take for the UAV. In case of receiving a trigger via SIB10/SIB11, the CD response may include one or more of CD_ID, CD_time, and pre-determined data such as location, battery status, biometric data, and accelerometer data.

In case of receiving a trigger via aux SIB, the CD response may include one or more of CD_ID (random temporary ID), CD_time, received counter value n, pre-determined data such as location, battery status, biometric data and accelerometer data, and further data according to aux SIB field response data, such as:

Input number of people in the vicinity and/or
Input health status: 0=Ok, 1=stress, 2=injury.

The UAV then collects and aggregates data from CDs within range and within a time interval for decision support. The collected data may:

determine number of CDs within range and within a time interval,
known CDs (preregistered CDs such as rescue staff, and other CDs previously unknown)
determine number of responding CDs
Known CDs (preregistered CDs such as rescue staff, and other CDs previously unknown)
determine status of each responding CD
Aggregate status from responding CDs within range and within the time interval
log CD response (e.g. counter, time, location of UAV and CD)

Number of CDs found, number of CDs responding, and number of CDs providing manual response within range and within time interval, may e.g. provide a ratio of people responding manually/found CDs. A low ratio may indicate that few people are able to respond, i.e. an unclear situation. A high ratio may indicate that many people responds, i.e. a better overview of the situation and possible urgent needs.

The advantage of receiving and aggregating CD responses is to obtain vital data from an emergency area and to both identify people in distress and to get an overview of the situation. By this process the UAV will know the number of CDs in the area, the number of responding CDs in the area, and emergency status for single CDs and for CDs within range.

The UAV may continuously, as it collects data from one or more CDs, analyze collected data and determine to take appropriate action, based therein and possible UAV sensor data and UAV status. UAV sensor data may e.g. provide information about the surroundings. UAV status may e.g. be battery or fuel status.

The collected date may be analyzed, e.g. by processors, databases and ML algorithms, continuously and may impact appropriate action to take. A high ratio and urgent needs, possibly combined with UAV data (audio, image, etc), may indicate danger, further possibly combined with available UAV fly time, may indicate that the UAV should immediate be directed to return to Operation Center.

The UAV may now take appropriate action depending on the determined emergency status.

The emergency_response_trigger sent by the UAV may be included in existing SIBs (SIB10 or SIB11) as a pre-defined value in the SIB field serial_number. The predefined value may e.g. represent "trigger automatic response: 1 (yes)" or "trigger automatic and manual response: 0 (no)".

The CD receives and decodes the received value, such as e.g. "trigger automatic response: 1 (yes)", of the field serial_number and automatically responds and includes pre-defined data, such as e.g. location, battery status, CD_ID, and accelerometer data. Receiving and decoding a value such as "trigger automatic and manual response: 0 (no)" may additionally allow the user to communicate with the UAV, by responding to certain, predefined questions. In the latter scenario, such a communication can commence in a dialogue, comprising a suitable number of interactions, depending on the response.

To make the CD to respond to existing SIBs requires the CD to be programmed to respond in a pre-defined way upon receiving the emergency_response_trigger, or requires that an app installed in the CD is configured to make the CD respond in the pre-defined way.

Another alternative is to use a separate auxiliary SIB to include the emergency_response_trigger, which allow more details about required type of response, such as how to respond, synch data, and which data to include.

When the CD receives the auxiliary SIB (which triggers a response) it decodes the system information and its fields and responds accordingly. This requires the CD to be programmed to respond according to information included in the auxiliary SIB.

The advantage of the auxiliary SIB compared to use of SIB10 or SIB11 is a dedicated SIB with fields that can be modified to trig alternative CD responses. A counter may e.g. be used by the UAV to keep track of sent SIBs (associated with UAV position and clock) and map sent SIBs with CD responses.

The presented embodiments may be beneficial both for emergency cases where UAVs emulate cellular networks in areas completely without coverage, but also in disaster situation like flooding, earthquake situations when large numbers of people may provide critical information to emergency centers in areas partly without coverage.

Figure 4:
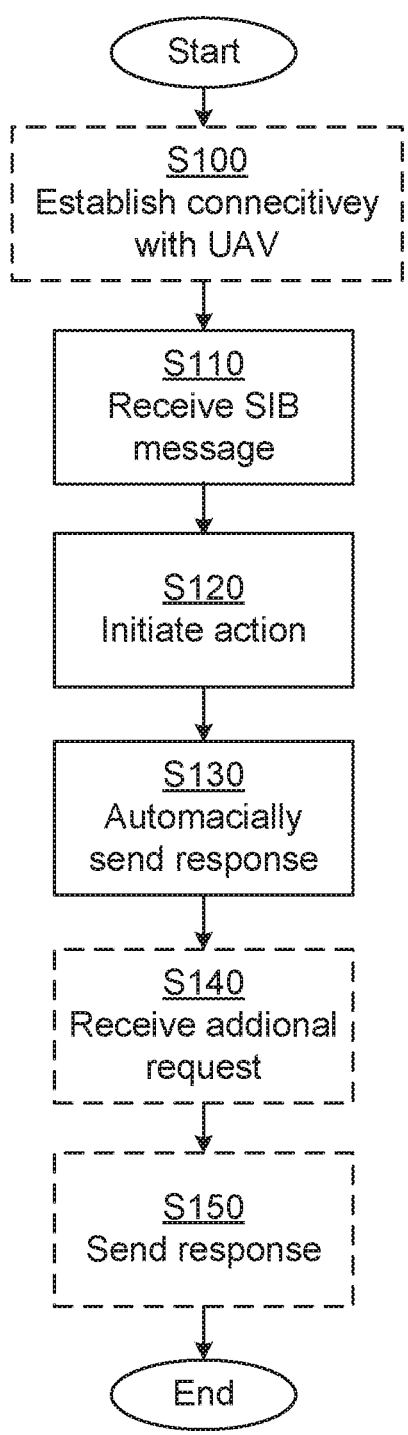
FIGS. 4-5 are flow charts illustrating methods for embodiments presented herein.

A method, according to an embodiment, for enabling autonomous emergency assistance for one or more CD registered in a regular cellular network is presented with reference to FIG. 4. The method is performed in a CD and comprises receiving S110 an information message from an UAV, the message comprising an emergency response trigger, wherein the UAV and CD are without connectivity with the regular cellular network, initiating S120 one or more action in response to the received emergency response trigger, and automatically sending S130 an emergency data response message comprising content based on the initiated one or more action to the UAV.

The method may further comprise establishing S100 further connectivity with the UAV.

The automatic emergency data response message may comprise any of the information suggested above.

The received information message may be comprised of a paged SIB message. The SIB message may comprises any of the information suggested above.

The method may further comprise acquiring sensor data.

The method may further comprise receiving S140 a request for additional emergency data through hypermedia message, short text message and/or voice communication, and sending S150 an additional emergency data response through corresponding hypermedia message, short text message and/or voice communication. In case the UAV requests for additional responses, steps S140 and S150 may be repeated one or more times.

A CD, according to an embodiment, for enabling autonomous emergency assistance for the CD registered in a regular cellular network is presented with reference to FIG. 6. The CD comprises processing circuitry, comprising at least one processor 10 and a computer program product 12, 13 storing instructions that, when executed by the processor, causes the CD to receive S110 an information message from an UAV, the message comprising an emergency response trigger, wherein the UAV and CD are without connectivity with the regular cellular network, to initiate S120 one or more action in response to the received emergency response trigger, and to automatically send S130 an emergency data response message comprising content based on the initiated one or more action to the UAV.

The CD may further be caused to establish S100 connectivity with the UAV.

The automatic emergency data response message may comprise an indication of one or more of the following: CD identity, CD time, SIB counter value, battery status, emergency status, and sensor data.

The received information message may be comprised of a paged system information block, SIB, message. The SIB message may comprise one or more of the following: a parameter initiating an automatic response by the CD, a parameter initiating a CD client application, a UAV credential for device-to-device, D2D, communication in the geographical region, an instruction to collect CD sensor data, and image data from the UAV.

The CD may further be caused to acquire sensor data.

The CD may further be caused to receive S140 a request for additional emergency data through hypermedia message, short text message and/or voice communication, and to send S150 an additional emergency data response through corresponding hypermedia message, short text message and/or voice communication.

FIG. 6 is a schematic diagram showing some components of the CD 1. A processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The computer program may be implemented as an app in the CD, configured to perform method steps descried herein with reference to FIG. 4. The computer program may alternatively be implemented in other ways, such as by being pre-configured program in the CD, or by being a program which is downloadable into the CD without being an app. The memory can thus be considered to be or form part of the computer program product 12. The processor 10 may be configured to execute methods described herein with reference to FIG. 4.

An app in a CD may be configured to causes the CD to receive S110 an information message from an UAV, the message comprising an emergency response trigger, wherein the UAV and CD are without connectivity with the regular cellular network, to initiate S120 one or more action in response to the received emergency response trigger, and to automatically send S130 an emergency data response message comprising content based on the initiated one or more action to the UAV.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the CD 1.

The CD 1 may further comprise an input/output, I/O, interface ii including e.g. a user interface. The CD 1 may further comprise a receiver configured to receive signalling from other nodes, and a transmitter configured to transmit signalling to other nodes (not illustrated). Other components of the CD 1 are omitted in order not to obscure the concepts presented herein.

FIG. 8 is a schematic diagram showing functional blocks of the CD 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 4, comprising a determination manager unit 80 and a communication manager unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 80 is for enabling autonomous emergency assistance for the CD registered in a regular cellular network. This module corresponds to the establish step S100, initiate step S120 and automatically step S130 of FIG. 4. This module can e.g. be implemented by the processor 10 of FIG. 6, when running the computer program.

The communication manager 81 is for enabling autonomous emergency assistance for the CD registered in a regular cellular network. This module corresponds to the receive step S110, the receive step S140 and the send step S150 of FIG. 4. This module can e.g. be implemented by the processor 10 of FIG. 6, when running the computer program.

A computer program 14, 15, according to an embodiment, for enabling autonomous emergency assistance for a CD registered in a regular cellular network is presented with reference to FIG. 6. The computer program comprising computer program code which, when run on the CD, causes the CD to provide S100 one or more geographical position, connected to corresponding preregistered periods of time, to the regular cellular network, wherein the provided one ore more geographical position is preregistered in the regular cellular network, to receive S110 an information message from an UAV, the message comprising an emergency response trigger, wherein the UAV and CD are without connectivity with the regular cellular network, to initiate S120 one or more action in response to the received emergency response trigger, and to automatically send S130 an emergency data response message comprising content based on the initiated one or more action to the UAV.

Figure 5:
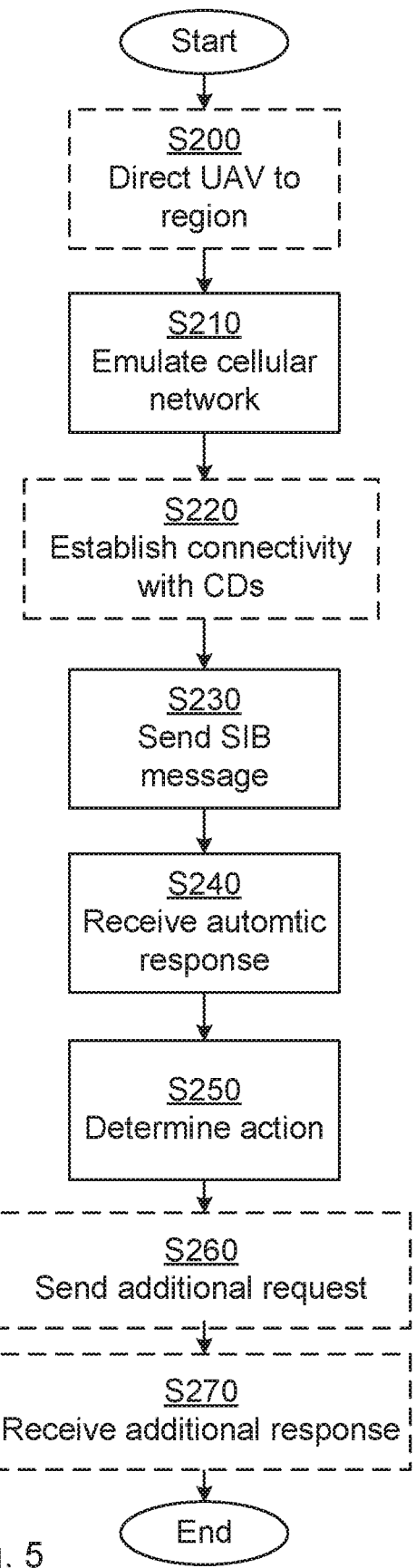

A method, according to an embodiment, for enabling autonomous emergency assistance for one or more CD registered in a regular cellular network is presented with reference to FIG. 5. The method is performed in an UAV and comprises emulating S210 a cellular network in a geographical region, wherein the UAV and the one or more CD are without connectivity with the regular cellular network, sending S230 an information message in the geographical region, the message comprising an emergency response trigger, receiving S240 an automatic emergency data response from the one or more CD in the geographical region, in response to the sent message, and determining S250 an action based on the received automatic emergency data response.

The method may further comprise directing S200 the UAV to a geographical region wherein the one or more CD is expected to be without connectivity with the regular cellular network.

The automatic emergency data response message may be included in a Random Access Channel, RACH, response message.

The sending S230 maybe comprised of paging a SIB message. The SIB message may comprise one or more of the following: a parameter initiating an automatic response by the CD, a parameter initiating a CD client application, a UAV credential for device-to-device, D2D, communication in the geographical region, an instruction to collect CD sensor data, and image data.

The method may further comprise establishing S220 connectivity with the one or more CD.

The automatic emergency data response message may comprise an indication of one or more of the following: CD identity, CD time, SIB counter value, battery status, emergency status, and sensor data.

The determining S250 step may comprise determining one or more of the following: number of preregistered CDs in the geographical region, number of other CDs in the geographical region, status of each responding CD.

The action may be further based on sensor data acquired in the geographical region. The sensor data may be acquired from the UAV and the CD.

The action may be one or more of the following: directing the UAV to backhaul connectivity, directing the UAV to a new geographical region, notifying a rescue team CD within the geographical region, initiating communication with the one ore more CD, and sending an information message to the one or more CD.

The method may further comprise sending S260 a request for additional emergency data through at least one of hypermedia message, short text message and voice communication, and receiving S270 an additional emergency data response through corresponding hypermedia message, short text message and/or voice communication. Steps S260 and S270 may be repeated one or more times in case further questions, such as follow-up questions, are sent. In the latter situation, a determine action may be initiated also after a reception of an additional response, received in step S270.

An UAV, according to an embodiment, for enabling autonomous emergency assistance for one or more CD registered in a regular cellular network is presented with reference to FIG. 7. The UAV comprises processing circuitry, comprising at least one a processor 20, and a computer program product 22, 23 storing instructions that, when executed by the processor, causes the UAV to emulate S210 a cellular network in a geographical region, wherein the UAV and the one or more CD are without connectivity with the regular cellular network, to send S230 an information message in the geographical region, the message comprising an emergency response trigger, to receive S240 an automatic emergency data response from the one or more CD in the geographical region, in response to the sent message, and to determine S250 an action based on the received automatic emergency data response.

The UAV may further be caused to direct S200 the UAV to a geographical region wherein the one or more CD is expected to be without connectivity with the regular cellular network.

The automatic emergency data response message may be included in a RACH response message.

The sending S230 may be comprised of paging a SIB message.

The SIB message may comprise one or more of the following: a parameter initiating an automatic response by the CD, a parameter initiating a CD client application, a UAV credential for device-to-device, D2D, communication in the geographical region, an instruction to collect CD sensor data, and image data.

The UAV may further be caused to establish S220 connectivity with the one or more CD.

The automatic emergency data response message may comprise an indication of one or more of the following: CD identity, CD time, SIB counter value, battery status, emergency status, and sensor data.

The determine S250 step may comprise determining one or more of the following: number of preregistered CDs in the geographical region, number of other CDs in the geographical region, status of each responding CD.

The action may further be based on sensor data acquired in the geographical region. The sensor data may be acquired from the UAV and the CD.

The action may be one or more of the following: directing the UAV to backhaul connectivity, directing the UAV to a new geographical region, notifying a rescue team CD within the geographical region, initiating communication with the one ore more CD, and sending an information message to the one or more CD.

The UAV may further be caused to send S260 a request for additional emergency data through at least one of hypermedia message, short text message and voice communication, and receive S270 an additional emergency data response through corresponding hypermedia message, short text message and/or voice communication.

FIG. 7 is a schematic diagram showing some components of the UAV 2. A processing circuitry 20 may be provided using any combination of one or more of a suitable central processing unit, CPU, multiprocessor, microcontroller, digital signal processor, DSP, application specific integrated circuit etc., capable of executing software instructions of a computer program 24 stored in a memory. The memory can thus be considered to be or form part of the computer program product 22. The processing circuitry 20 may be configured to execute methods described herein with reference to FIG. 5.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 23 in the form of a data memory may also be provided, e.g. for reading and/or storing data during execution of software instructions in the processor 20. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 25, to improve functionality for the UAV 2.

The UAV 2 may further comprise an input/output (I/O) interface 21 including e.g. a user interface. The UAV 2 may further comprise a receiver configured to receive signalling from other nodes, and a transmitter configured to transmit signalling to other nodes (not illustrated). Other components of the UAV 2 are omitted in order not to obscure the concepts presented herein.

FIG. 9 is a schematic diagram showing functional blocks of the UAV 2. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the method illustrated in FIG. 5, comprising a determination manager unit 90 and a communication manager unit 91. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 90 is for enabling autonomous emergency assistance for a CD registered in a regular cellular network. This module corresponds to the direct step S200, the emulate step S210, and the determine step S250 of FIG. 5. This module can e.g. be implemented by the processor 20 of FIG. 7, when running the computer program.

The communication manager 91 is for enabling autonomous emergency assistance for a CD registered in a regular cellular network. This module corresponds to the establish step S220, the send step S230, the receive step S240, the send step S260 and the receive step S270 of FIG. 5, and, thus, in addition to providing a suitable trigger to CDs, the communication manager 91 is also configured to provide one or more suitable requests to CDs and to process responses to such requests. The communication manager 91 may also be configured to trigger further requests to a CD, typically based on responses and/or a pre-set scheme, thereby establishing a dialogue between the UAV and the CD, where such a dialogue may be based on automatic responses or a combination of automatic and manually entered responses. This module can e.g. be implemented by the processor 20 of FIG. 7, when running the computer program.

A computer program 24, 25, according to an embodiment, for enabling autonomous emergency assistance for a CD registered in a regular cellular network is presented with reference to FIG. 7. The computer program comprising computer program code which, when run on an UAV, causes the UAV to emulate S210 a cellular network in a geographical region, wherein the UAV and the one or more CD are without connectivity with the regular cellular network, to send S230 an information message in the geographical region, the message comprising an emergency response trigger, to receive S240 an automatic emergency data response from the one or more CD in the geographical region, in response to the sent message, and to determine S250 an action based on the received automatic emergency data response.

A computer program product 12, 13 and 22, 23 comprising a computer program 14, 15 and 24, 25 and a computer readable storage means on which the computer program 14, 15 and 24, 25 is stored, is also presented with reference to FIGS. 6 and 79.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for enabling autonomous emergency assistance for one or more communication device, CD, registered in a regular cellular network, the method being performed in an autonomous unmanned aerial vehicle, UAV, and comprising:
   emulating a cellular network in a geographical region, wherein the UAV and the one or more CD are without connectivity with the regular cellular network;
   sending an information message in the geographical region, the message comprising an emergency response trigger, wherein the emergency response trigger comprises a request for specific data, in addition to location data;
   receiving requested specific data in an automatic emergency data response from the one or more CD in the geographical region, in response to the sent message; and
   determining an action based on the specific data received in the automatic emergency data response.

2. The method according to claim 1, further comprising: directing the UAV to a geographical region wherein the one or more CD is expected to be without connectivity with the regular cellular network.

3. The method according to claim 1, wherein the automatic emergency data response message is included in a Random Access Channel, RACH, response message.

4. The method according to claim 1, wherein the sending is comprised of paging a system information block, SIB, message.

5. The method according to claim 4, wherein the SIB message comprises one or more of the following: a parameter initiating an automatic response by the CD, a parameter initiating a CD client application, a UAV credential for device-to-device, D2D, communication in the geographical region, an instruction to collect CD sensor data, and image data.

6. The method according to claim 1, further comprising: establishing connectivity with the one or more CD.

7. The method according to claim 1, wherein the automatic emergency data response message comprises an indication of one or more of the following: CD identity, CD time, SIB counter value, battery status, emergency status, and sensor data.

8. The method according to claim 1, wherein the determining step comprises determining one or more of the following: number of preregistered CDs in the geographical region, number of other CDs in the geographical region, status of each responding CD.

9. The method according to claim 1, wherein the action further is based on sensor data acquired in the geographical region.

10. The method according to claim 9, wherein the sensor data is acquired from the UAV and the CD.

11. The method according to claim 1, wherein the action is one or more of the following: directing the UAV to backhaul connectivity, directing the UAV to a new geographical region, notifying a rescue team CD within the geographical region, initiating communication with the one or more CD, and sending an information message to the one or more CD.

12. The method according to claim 1, further comprising:
sending a request for additional emergency data through at least one of hypermedia message, short text message and voice communication; and
receiving an additional emergency data response through corresponding hypermedia message, short text message and/or voice communication.

13. A method for enabling autonomous emergency assistance for a communication device, CD, registered in a regular cellular network, the method being performed in the CD, and comprising:
receiving an information message from an autonomous unmanned aerial vehicle, UAV, the message comprising an emergency response trigger, wherein the emergency response trigger comprises a request for specific data, in addition to location data, wherein the UAV and CD are without connectivity with the regular cellular network;
initiating one or more action in response to the received emergency response trigger; and
automatically sending an emergency data response message comprising requested specific data.

14. The method according to claim 13, further comprising:
establishing connectivity with the UAV.

15. The method according to claim 13, wherein the automatic emergency data response message comprises an indication of one or more of the following: CD identity, CD time, SIB counter value, battery status, emergency status, and sensor data.

16. The method according to claim 13, wherein the received information message is comprised of a paged system information block, SIB, message.

17. The method according to claim 16, wherein the SIB message comprises one or more of the following: a parameter initiating an automatic response by the CD, a parameter initiating a CD client application, a UAV credential for device-to-device, D2D, communication in the geographical region, an instruction to collect CD sensor data, and image data from the UAV.

18. The method according to claim 13, further comprising acquiring sensor data.

19. The method according to claim 13, further comprising:
receiving a request for additional emergency data through hypermedia message, short text message and/or voice communication; and
sending an additional emergency data response through corresponding hypermedia message, short text message and/or voice communication.

20. An autonomous unmanned aerial vehicle, UAV, for enabling autonomous emergency assistance for one or more communication device, CD, registered in a regular cellular network, the UAV comprising:
a processor; and
a computer program product storing instructions that, when executed by the processor, causes the UAV to:
emulate a cellular network in a geographical region, wherein the UAV and the one or more CD are without connectivity with the regular cellular network;
send an information message in the geographical region, the message comprising an emergency response trigger, wherein the emergency response trigger comprises a request for specific data, in addition to location data;
receive requested specific data in an automatic emergency data response from the one or more CD in the geographical region, in response to the sent message; and
determine an action based on the requested specific data received in the automatic emergency data response.

21. The UAV according to claim 20, further caused to:
direct the UAV to a geographical region wherein the one or more CD is expected to be without connectivity with the regular cellular network.

22. The UAV according to claim 20, wherein the automatic emergency data response message is included in a Random Access Channel, RACH, response message.

23. The UAV according to claim 20, wherein the sending is comprised of paging a system information block, SIB, message.

24. The UAV according to claim 23, wherein the SIB message comprises one or more of the following: a parameter initiating an automatic response by the CD, a parameter initiating a CD client application, a UAV credential for device-to-device, D2D, communication in the geographical region, an instruction to collect CD sensor data, and image data.

25. The UAV according to claim 20, further caused to:
establish connectivity with the one or more CD.

26. The UAV according to claim 20, wherein the automatic emergency data response message comprises an indication of one or more of the following: CD identity, CD time, SIB counter value, battery status, emergency status, and sensor data.

27. The UAV according to claim 20, wherein the determine step comprises determining one or more of the following: number of preregistered CDs in the geographical region, number of other CDs in the geographical region, status of each responding CD.

28. The UAV according to claim 20, wherein the action further is based on sensor data acquired in the geographical region.

29. The UAV according to claim 28, wherein the sensor data is acquired from the UAV and the CD.

30. The UAV according to claim 20, wherein the action is one or more of the following: directing the UAV to backhaul connectivity, directing the UAV to a new geographical region, notifying a rescue team CD within the geographical region, initiating communication with the one or more CD, and sending an information message to the one or more CD.

31. The UAV according to claim 20, further caused to:
send a request for additional emergency data through at least one of hypermedia message, short text message and voice communication; and
receive an additional emergency data response through corresponding hypermedia message, short text message and/or voice communication.

32. A communication device, CD, for enabling autonomous emergency assistance for the CD registered in a regular cellular network, the CD comprising:
a processor; and
a computer program product storing instructions that, when executed by the processor, causes the CD to:
receive an information message from an autonomous unmanned aerial vehicle, UAV, the message comprising an emergency response trigger, wherein the emergency response trigger comprises a request for specific data, in addition to location data, wherein the UAV and CD are without connectivity with the regular cellular network;
initiate one or more action in response to the received emergency response trigger; and
automatically send an emergency data response message comprising requested specific data.

33. The CD according to claim 32, further caused to:
establish connectivity with the UAV.

34. The CD according to claim 32, wherein the automatic emergency data response message comprises an indication of one or more of the following: CD identity, CD time, SIB counter value, battery status, emergency status, and sensor data.

35. The CD according to claim 32, wherein the received information message is comprised of a paged system information block, SIB, message.

36. The CD according to claim 35, wherein the SIB message comprises one or more of the following: a parameter initiating an automatic response by the CD, a parameter initiating a CD client application, a UAV credential for device-to-device, D2D, communication in the geographical region, an instruction to collect CD sensor data, and image data from the UAV.

37. The CD according to claim 32, further caused to acquire sensor data.

38. The CD according to claim 32, further caused to:
receive a request for additional emergency data through hypermedia message, short text message and/or voice communication; and
send an additional emergency data response through corresponding hypermedia message, short text message and/or voice communication.

\* \* \* \* \*